United States Patent [19]
Yuda

[11] Patent Number: 5,135,329
[45] Date of Patent: Aug. 4, 1992

[54] ALIGNMENT COUPLER

[76] Inventor: Lawrence F. Yuda, P.O. Box 499, Westminster, S.C. 29693

[21] Appl. No.: 623,575

[22] Filed: Dec. 7, 1990

[51] Int. Cl.$^5$ ............................................ F16B 21/10
[52] U.S. Cl. ............................ 403/226; 403/360; 403/361
[58] Field of Search ............... 403/361, 225, 226, 132, 403/133, 140, 78, 165, 365, 372, 300, 360; 267/294, 292, 153, 141.1; 411/166, 133, 103; 92/140

[56] References Cited

U.S. PATENT DOCUMENTS

| | | | |
|---|---|---|---|
| 1,857,168 | 5/1932 | Steiner et al. | 403/226 X |
| 1,872,259 | 8/1932 | Eldridge | 403/226 X |
| 2,115,458 | 4/1938 | Geyer | 403/225 X |
| 2,868,570 | 1/1959 | Hines et al. | 403/226 |
| 3,574,369 | 4/1971 | Andrew | 403/132 |
| 4,136,787 | 1/1979 | Forster et al. | 403/226 X |

Primary Examiner—Peter M. Cuomo
Attorney, Agent, or Firm—Bailey & Hardaway

[57] ABSTRACT

An alignment coupler is illustrated having a flat head screw permitting radial adjustment between a workpiece and a piston rod and a second screw making connection with a cylinder to compensate for direct misalignment wherein first and second rings of high density polyethylene and the like are provided to impart shock absorbing and noise dampening characteristics to the coupler between the first and second screws.

3 Claims, 2 Drawing Sheets

ALIGNMENT COUPLER

BACKGROUND OF THE INVENTION

This invention relates to a compact coupling for connecting a piston rod to a workpiece making provision for radial as well as direct misalignment while avoiding shock, noise and excessive wear.

Alignment couplers in accordance with the prior art provide limited means for compensating for radial misalignment and for direct misalignment. Such couplers generally have a substantial length dimension. Another problem is engendered through shock resulting to the various parts as a result of repeated successive operations of the cylinder to effect back and forth movement of the workpiece which is in this case illustrated in the form of a sled. A rod coupler which is relatively compact has heretofore been provided utilizing a first flat head screw to provide radial adjustment between the workpiece and the piston rod, while a second screw provides connection with the piston rod while compensating for radial misalignment through transverse movement thereof. Such apparatus possesses disadvantages in that repeated operations of the cylinder and related apparatus results in excessive shock subjecting parts to extensive wear and results in excessive noise during operation.

Accordingly, it is an important object of this invention to provide an alignment coupler which may be relatively compact and which provides for shock absorbency with noise dampening while affording both radial and direct alignment adjustments.

Another important object of the invention is the prevention of excessive wear on the various parts of the apparatus through the use of cushioning rings constructed of high polyethylene and the like which permits both radial and direct alignment adjustment while affording protection against excessive shock and noise.

SUMMARY OF THE INVENTION

It has been found that a compact coupler may be provided for connecting a cylinder to a workpiece providing radial adjustment through the use of a flat head screw connection as well as making provision to compensate for direct alignment through the use of a carrier nut having a flange which is adjustable transversely while providing a connection for a second screw connector affixed to the piston rod. The flange has a first ring constructed of plastic cushioning material between the end of the flange and the flat head screw on one side, while a second ring also constructed of plastic cushioning material is passed over the carrier nut and seated on the other side of the flange to guard against excessive shock and noise.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate an alignment coupler for connecting a fluid operated cylinder having a piston rod to a workpiece in order to compensate for radial as well as direct misalignment therebetween. A housing having a wall A receives a first screw B permitting a radial adjustment between the workpiece and the piston rod. A carrier nut C includes a flange, a neck, and a body. A second screw D connects an end of the carrier nut remote from the wall to the piston rod for radial adjustment to compensate for radial misalignment. A seat in the housing receives the flange for transverse adjustment in any direction to compensate for direct misalignment. A first ring E is constructed of high density polyethylene and the like opposite one side of the flange in the seat adjacent the wall. A second ring F constructed of high density polyethylene and the like is carried on the other side of the flange in the seat. Thus, shock absorbing and noise dampening characteristics are imparted to an alignment coupler capable of compensating for both radial and direct misalignment.

The first screw B is preferably a flat head screw, and the housing wall has a tapered surface complementary to the flat head screw permitting radial adjustment therebetween. The body of the carrier nut C has an oblong cross section, and the second ring has a complementary opening therein for reception of the second ring over the carrier nut so as to provide maximum plastic cushioning material consistent with being able to pass over the oblong part of the carrier nut for installation.

Figure 1:
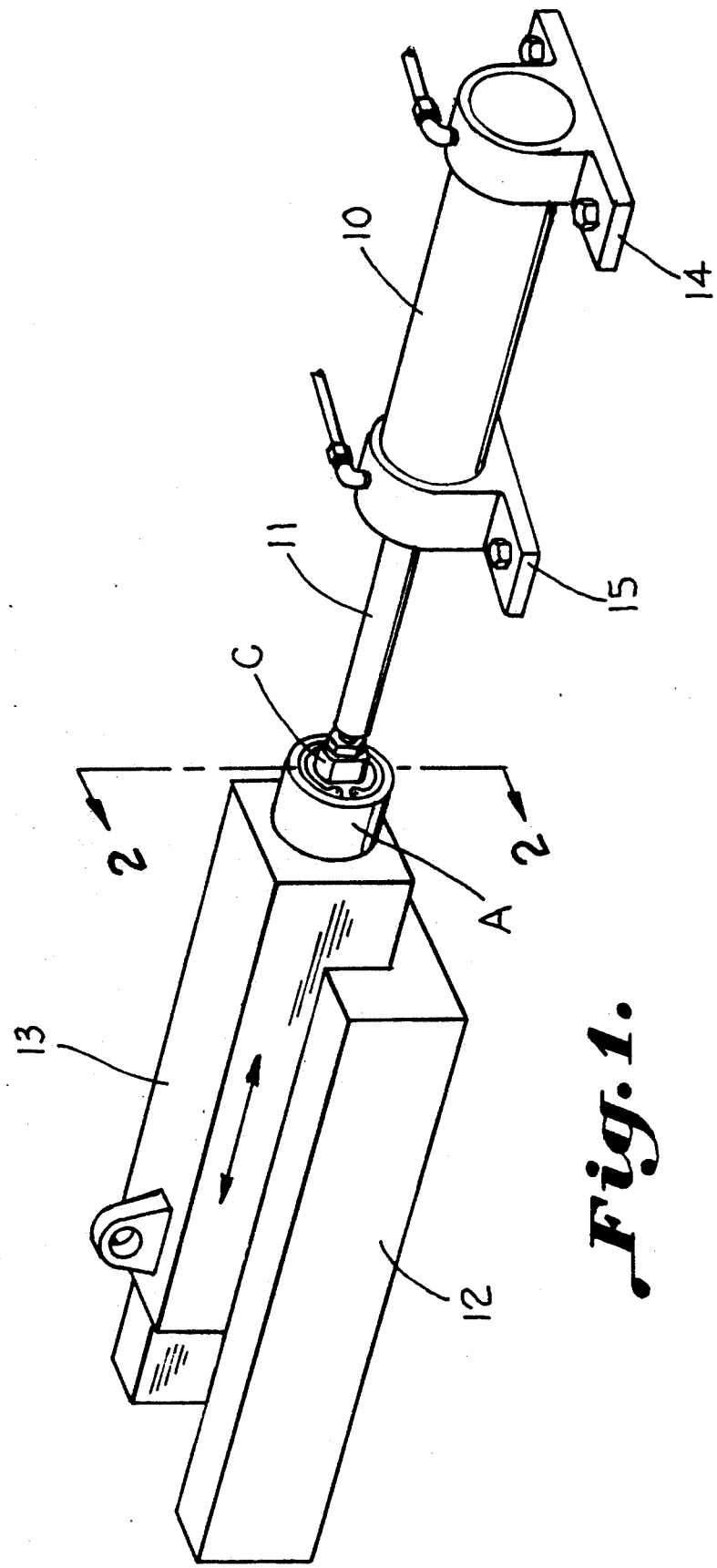
FIG. 1 is a perspective view illustrating an alignment coupler constructed in accordance with the present invention positioned between a cylinder having a piston rod and a workpiece for joining the two.

Referring more particularly to the drawings, FIG. 1 illustrates a cylinder 10 having a piston rod 11 connected through the alignment coupler constructed in accordance with the present invention to a workpiece such as the sled illustrated at 12 which has a slide 13 carried therein for movement back and forth therein.

It is important that compensation be made for any radial misalignment between the piston rod and the workpiece since such results in excessive stress and wear upon the rod shaft and seal and the bearing area. Direct misalignment results in galling and binding of the parts. It is also important to provide shock absorbent and noise dampening characteristics to the various parts of the coupling apparatus of the invention.

It is also important that the overall length dimension remain minimal in order to provide for proper fitting into small areas.

It will be noted that mounting brackets 14 and 15 are provided for receiving the cylinder in immobile or in fixed position such as on a work bench and the like. The workpiece 12 may likewise be secured in fixed position so that the slide 13 may oscillate back and forth therein.

Figure 2:
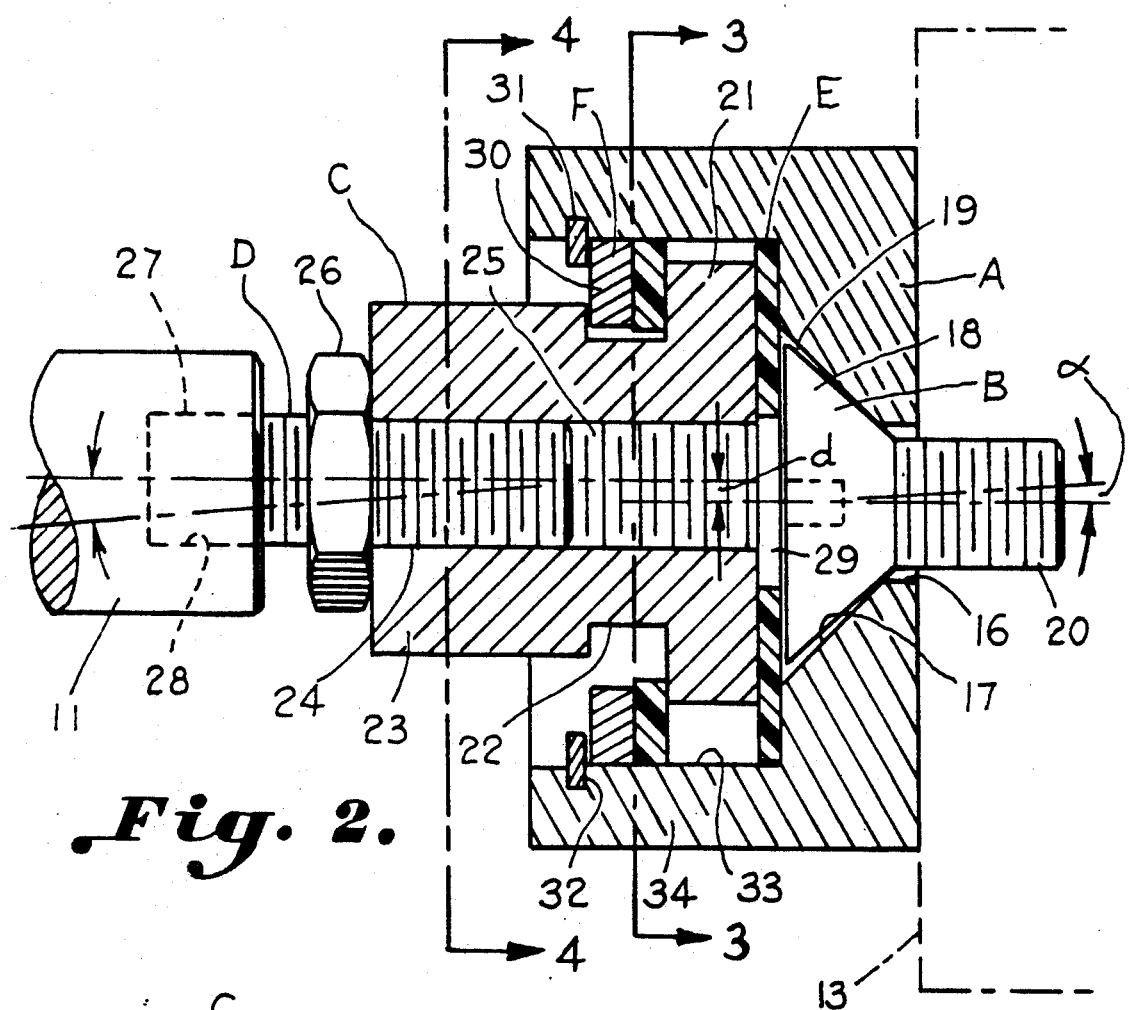
FIG. 2 is an enlarged longitudinal sectional elevation taken on the line 2—2 in FIG. 1.
Figure 3:
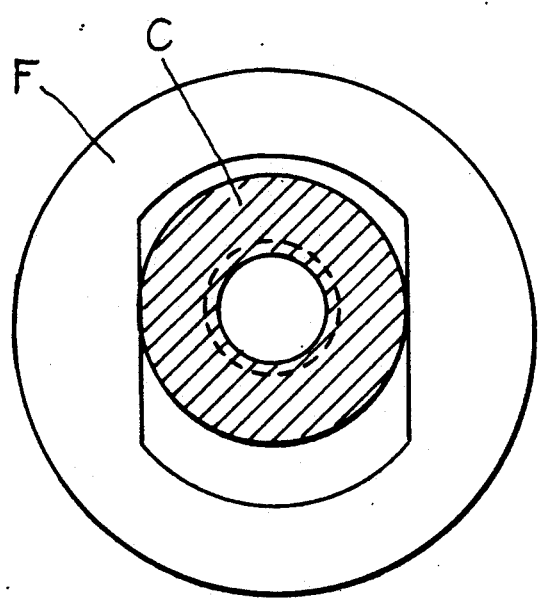
FIG. 3 is a transverse sectional elevation taken on the line 3—3 in FIG. 2.

The housing wall A is illustrated in FIG. 2 as being flush with the workpiece 13 and has an axial bore 16 therein which joins a conical outwardly tapering portion 17 to accommodate the flat head portion 18 of the first connector screw B. The flat head screw has a tapered conical portion 19 conforming to the tapered opening 17 in the wall A in such a manner as to provide limited radial adjustment as illustrated by the angle α. Opposite the flat head screw is a threaded shank 20 carried by a first screw B. If desired, other types of connector screws B in addition to the flat head screw may be utilized. For example, a shoulder screw, not shown, provides even greater adjustability in the case of axial or direct misalignment.

Figure 4:
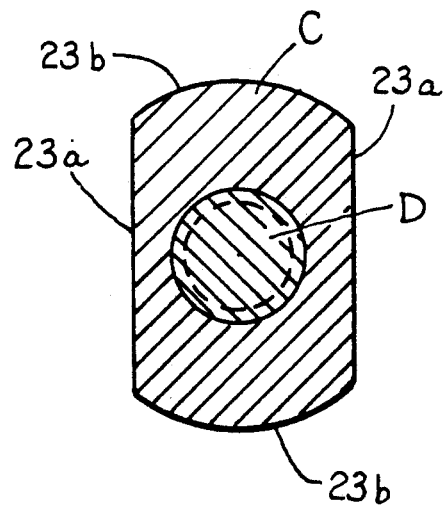
FIG. 4 is a transverse sectional elevation taken on the line 4—4 in FIG. 2.

The carrier nut C includes a flange 21, a neck 22 and a body 23 which is illustrated as being oblong having the greater dimension illustrated in the vertical direction in FIG. 4 with flat sides 23a opposite arcuate ends 23b. A second screw D has an elongated threaded shank 24 which extends into an internally threaded opening 25 which passes axially into the carrier nut C. A fastener nut 28 is threadably received upon the external portion of the threaded shank 24, and an externally threaded end portion of the shank passes into a threaded bore 28 within the piston rod 11. The threaded second screw D provides for transverse direct alignment adjustment as indicated by the distance d shown in FIG. 2.

A first ring E constructed of high density polyethylene has an opening 29 therein for reception of the flange 21 of the carrier nut C. The second ring F is carried on the other side of the flange 21 within the neck 22 and is confined in position by a retaining ring 30 carried in fixed position by the metallic snap ring 31 carried in the groove 32 within the seat portion 33 within the housing 34 which defines the wall A on one end thereof. The other end of the housing 34 remains open for reception of the carrier nut and related parts.

Unexpectedly, the combined compressibility of the plastic rings E and F allow for greater angular adjustment. If desired, the ring F may be a split ring to increase its confinability and for greater ease of installation as such would not be required to pass over the oblong portion of the carrier nut.

It is thus seen that an improved alignment coupler has been provided wherein radial and transverse alignment problems may be corrected through appropriate adjustment. Furthermore, shock absorbing characteristics have been imparted to the components with maximized utilization of cushioning material.

While a preferred embodiment of the invention has been described using specific terms, such description is for illustrative purposes only, and it is to be understood that changes and variations may be made without departing from the spirit or scope of the following claims.

What is claimed is:

1. An alignment coupler for connecting a fluid operated cylinder having a piston rod to a workpiece in order to compensate for radial as well as direct misalignment therebetween comprising:
    a housing having a wall receiving a first screw permitting a radial adjustment between the workpiece and said piston rod;
    a carrier nut including;
    a flange
    a neck having smaller cross sectional dimensions than said flange, and
    a body;
    a second screw connecting an end of said carrier nut remote from said wall to said piston rod for radial adjustment to compensate for radial misalignment;
    a seat in said housing receiving said flange and allowing sufficient space for transverse adjustment to compensate for direct misalignment;
    a first ring constructed of high density polymeric material carried in said seat between said flange and said wall; and
    a second ring constructed of high density polymeric material carried in said seat on an opposite side of said flange from said first ring;
    whereby shock absorbing and noise dampening characteristics are imparted to an alignment coupler capable of compensating for both radial and direct misalignment.

2. The structure set forth in claim 1 wherein said first screw is a flat head screw, and wherein said housing wall has a tapered surface complementary to said flat head screw permitting radial adjustment therebetween.

3. The structure set forth in claim 2 wherein said body of said carrier nut has an oblong cross section, and said second ring has a complementary opening therein for reception of said second ring thereover.

* * * * *